(12) United States Patent
Crowe et al.

(10) Patent No.: US 8,127,725 B2
(45) Date of Patent: Mar. 6, 2012

(54) ENGINE WITH HYDRAULIC VARIABLE VALVE TIMING

(75) Inventors: Jonathan Denis Crowe, Northville, MI (US); Jamie Charles Hanshaw, South Lyon, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 372 days.

(21) Appl. No.: 12/548,216

(22) Filed: Aug. 26, 2009

(65) Prior Publication Data
US 2011/0048346 A1     Mar. 3, 2011

(51) Int. Cl.
*F01L 1/34* (2006.01)
(52) U.S. Cl. .............. 123/90.15; 123/90.17; 464/160
(58) Field of Classification Search .......... 123/90.15, 123/90.16, 90.17, 90.18, 90.12, 90.13; 464/1, 464/2, 160
See application file for complete search history.

(56) References Cited

U.S. PATENT DOCUMENTS

| | | | |
|---|---|---|---|
| 5,483,930 A | 1/1996 | Moriya et al. | |
| 5,957,095 A | 9/1999 | Kako | |
| 6,161,511 A | 12/2000 | Hashimoto | |
| 6,763,791 B2 | 7/2004 | Gardner et al. | |
| 7,841,311 B2 * | 11/2010 | Hutcheson et al. | 123/90.17 |

* cited by examiner

*Primary Examiner* — Ching Chang
(74) *Attorney, Agent, or Firm* — Allan J. Lippa; Alleman Hall McCoy Russell & Tuttle LLP

(57) ABSTRACT

In one example, a method is described for an engine with a hydraulically actuated phaser for adjusting cam timing. The phaser is controlled by a hydraulic spool valve, for example, having a de-energized position that results in hydraulic force urging the phaser to a base timing. When it is desired to operate the cam timing at base timing, rather then leave the spool valve in a de-energized position that can generate leakage, the spool valve is adjusted to near a null position to reduce the hydraulic pressure drop across the cam journal and thus reduce oil leakage. In this way, it is possible to maintain base timing, while also reducing leakage.

20 Claims, 6 Drawing Sheets

ENGINE WITH HYDRAULIC VARIABLE VALVE TIMING

FIELD

The present application relates to methods for operating an engine with variable cam timing (VCT).

BACKGROUND AND SUMMARY

Internal combustion engines may use variable cam timing (VCT) to improve fuel economy and emissions performance of a vehicle. One method of variable cam timing uses an Oil Pressure Actuated device (OPA), such as a vane type cam phaser. The phaser may be controlled by an electromechanically actuated spool valve that directs oil flow to one side or the other of the vane. The performance of this device is thus dependent on oil pressure, which can be a function of engine speed and leakage through various oil subsystems. Therefore, the Oil Pressure Actuated device may have unacceptable performance at low engine speeds or when hydraulic subsystems exhibit high oil leakage.

One example VCT system includes a vane type actuator as well as an optional biasing spring to hold the cam timing in a base position whenever insufficient oil pressure is available to control position of the actuator via the spool valve. For example, the base timing may be a fully retarded timing desired for engine starting, since sufficient oil pressure is typically unavailable during engine starting operation.

The inventors herein have recognized that OPA cam phasers may be particularly prone to oil leakage and slow response time when held at base timing by hydraulic actuation force controlled by the spool valve. Specifically, under this condition, the spool valve is positioned in a full retarding actuation position, as the full retarding actuation position is often the default (de-energized) state of the spool valve. For the example of a cam-fed oil pressure actuated system, oil leakage may occur between the advance and retard oil passages in the cam journal bearing due to the pressure differential between the two passages. In the base position, oil fully pressurizes the base position oil passages in the cam journal. Because the oil control valve may have one port fully pressurized and another open to tank (atmosphere) in the de-energized position, too much oil may flow across the small radial clearance and the lateral seal land distance between the two passages in the cam journal (flow from high to low pressure). Oil flows through the oil passages and out of the drain port in the spool valve may reduce main galley oil pressure and thus create a significant oil pressure drop in the system.

As such, one approach to address the above issues includes a method of controlling an engine, the engine including a hydraulically actuated variable cylinder valve actuator coupled to a cylinder valve of the engine. The actuator is controlled by a hydraulic valve adjustable among a plurality of ranges including a first range generating a hydraulic force in a first direction on the actuator toward a first end position, a second range generating a hydraulic force in a second, opposite direction on the actuator toward a second, opposite end, position, and a neutral range between the first and second ranges. The method comprises during selected conditions and when the actuator is held at the first end position by a biasing spring, adjusting the valve to within the first range and closer to the neutral range than to a full actuation boundary of the first range. In one example, the variable cylinder valve actuator may include a variable cam timing system that further includes oil passages integrated into a cam journal. In another example, the hydraulically actuated variable cylinder valve actuator includes a variable cam timing vane type actuator having a biasing spring biasing the actuator toward a retarded cam timing base position.

In this way, when operating with the variable cam timing actuator at base timing, such as during idle conditions, the valve can be adjusted away from the full actuation boundary of the first range, thus reducing oil leakage, such as across a cam journal. This reduced leakage can thus increase main galley pressure and improve the performance of other hydraulic systems in the engine. Further, such positioning of the valve is acceptable as the actuator can still be maintained at base timing. In addition, when it is desired to move the cam timing away from base timing, a faster response (e.g., movement in the advance direction) can be achieved because there is less retard pressure to overcome.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 3A:
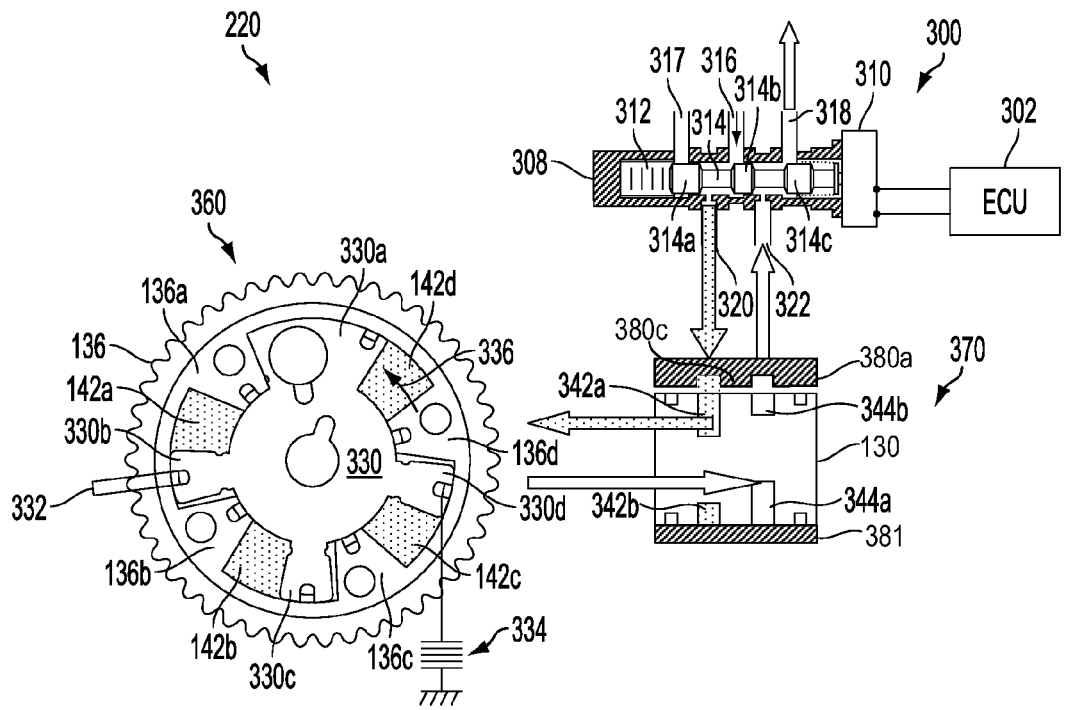
FIGS. 3A and 3B show an example VCT phaser and hydraulic system.
Figure 3B:
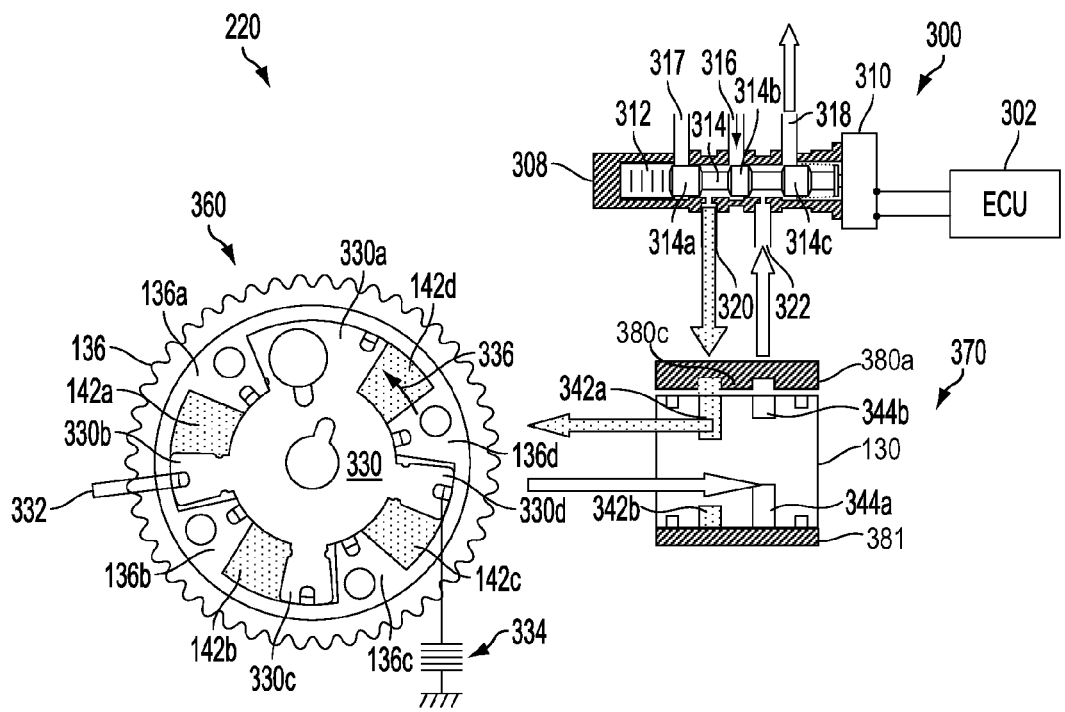
Figure 4:
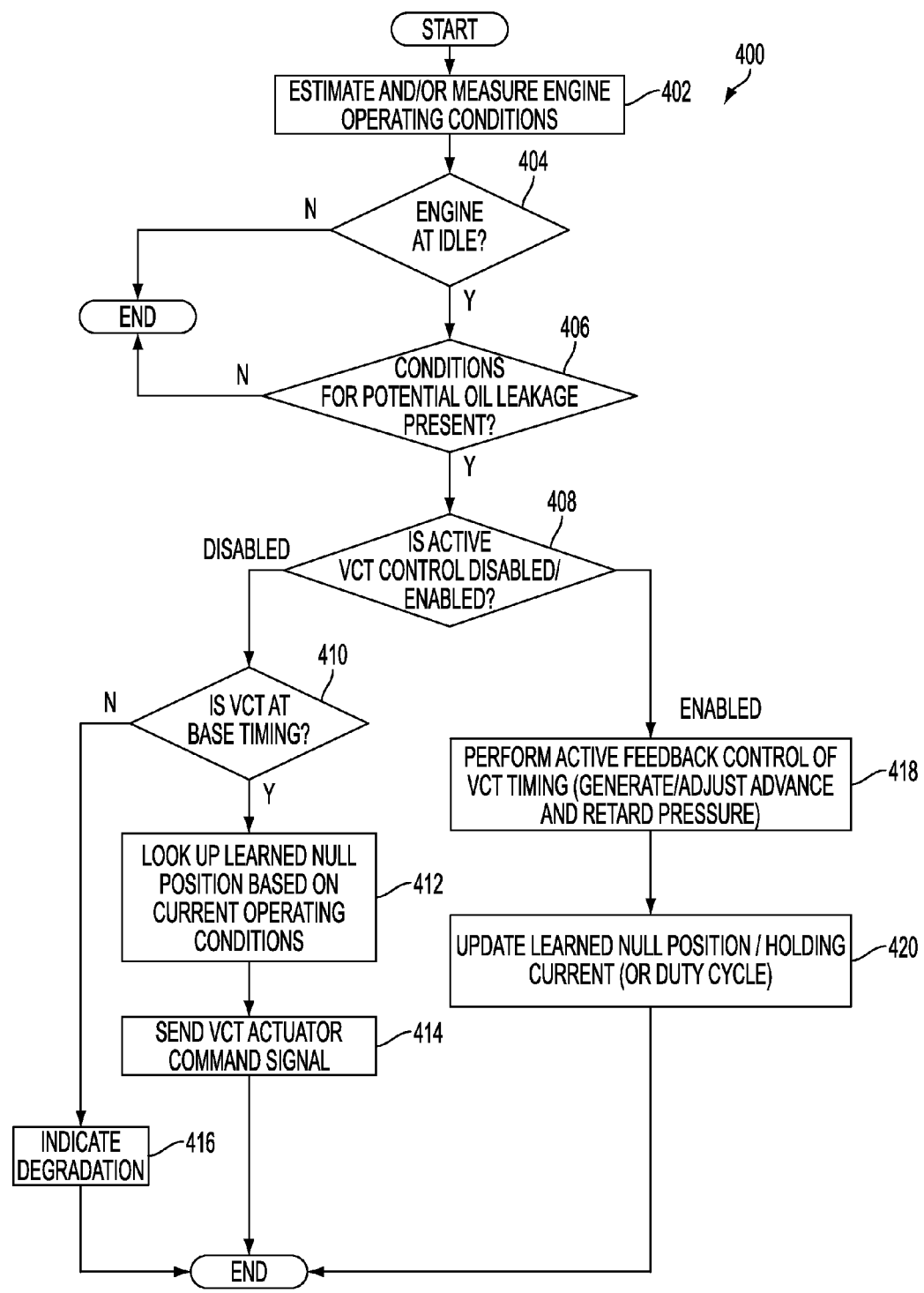
FIG. 4 shows a high level flow chart for sending a VCT phaser command under selected conditions, to reduce phaser leakage and improve phaser response time, according to the present disclosure.
Figure 5:
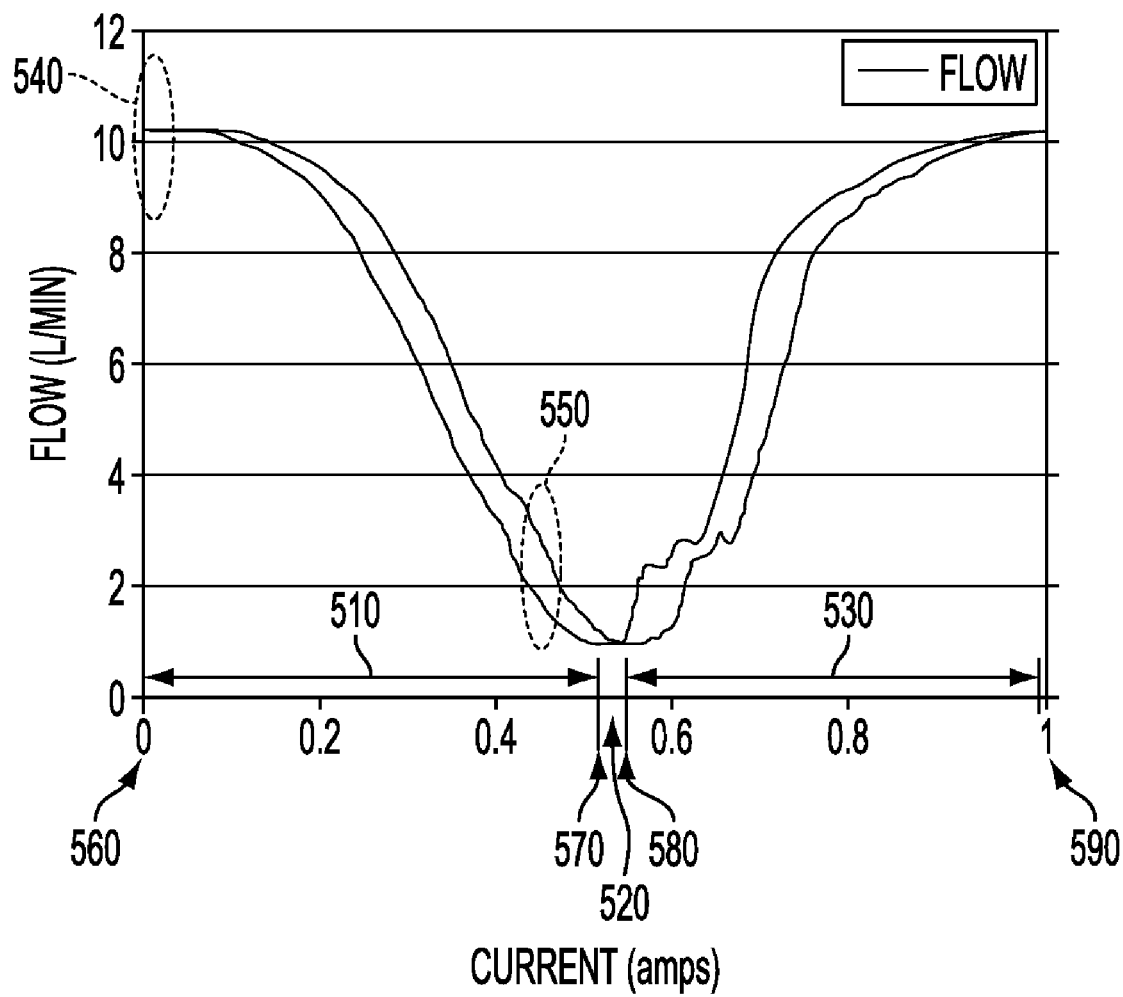
FIGS. 5-6 depict prophetic example data illustrating the neutral (null) holding position of the actuator and increased pressure achieved in one example.

The following description relates to systems and methods for controlling an engine of a vehicle, the engine having a variable cylinder valve system, such as a variable cam timing (VCT). For example, the engine (such as the one illustrated in FIG. 1) may include a VCT phaser to adjust the cam timing (such as, an amount of cam retard or cam advance), where the phaser is included in a hydraulic system (such as described in FIG. 2). Further, the engine may include a corresponding hydraulic control system having a spool valve, as illustrated in FIGS. 3A and 3B. The hydraulic system and thus cam timing may be adjusted using a control algorithm, such as shown in FIG. 4, to reduce oil leakage and/or increase oil pressure during engine operation with the cam phaser in a base position. In one particular example, the routine includes adjusting the spool valve to a range away from a neutral/null position of the spool valve, such as illustrated in FIG. 5, during engine idling conditions when the cam timing is commanded to be at base timing. In this way, it is possible to reduce oil pressure across a cam journal while maintaining the cam timing in the base position, thus reducing oil leakage and/or increasing oil pressure, as shown by the prophetic test results of FIG. 6.

Figure 1:
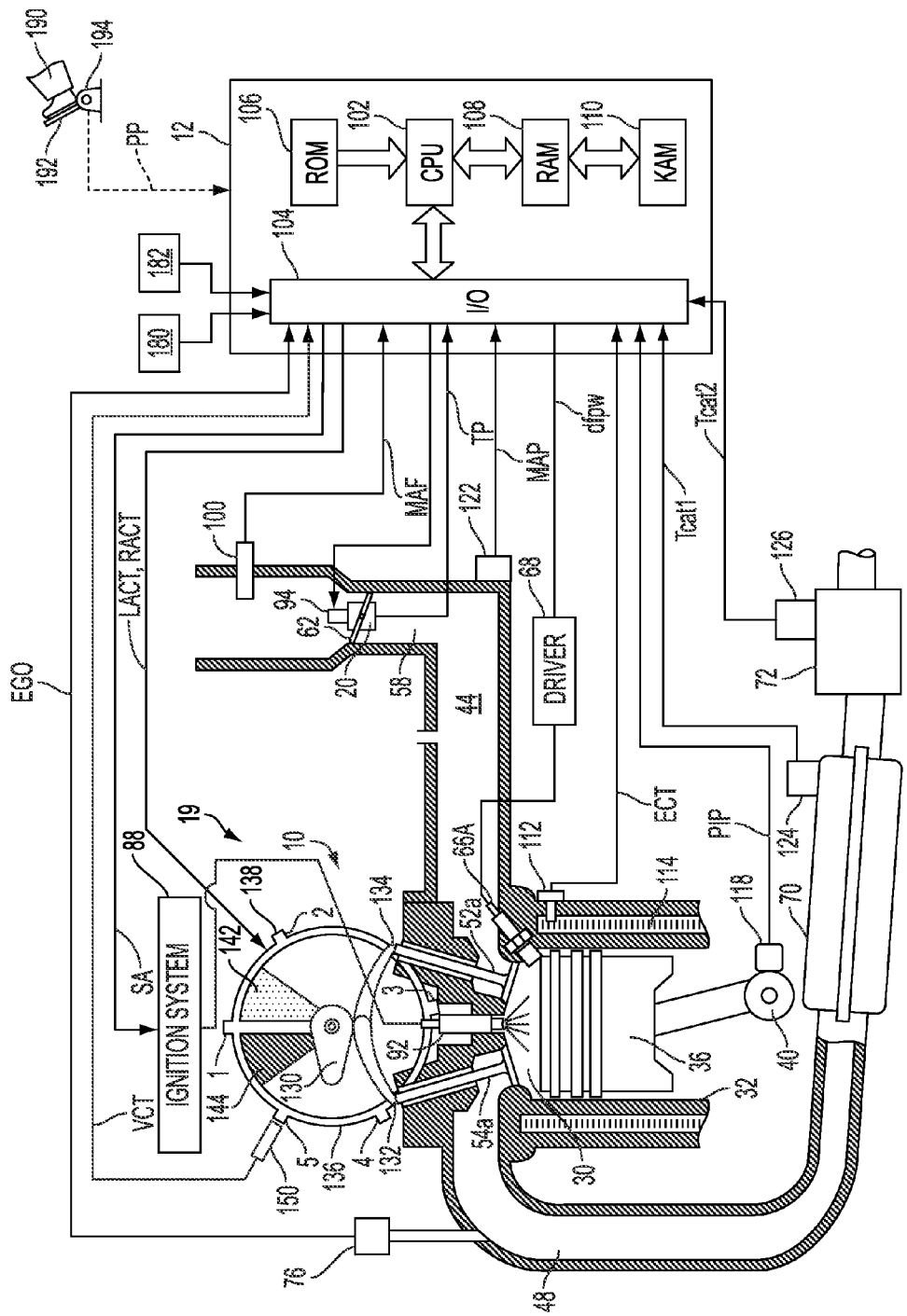
FIG. 1 shows a partial engine and related systems view.

FIG. 1 depicts an example embodiment of a combustion chamber or cylinder of internal combustion engine 10. FIG. 1 shows that engine 10 may receive control parameters from a control system including controller 12, as well as input from a vehicle operator 190 via an input device 192. In this example, input device 192 includes an accelerator pedal and a pedal position sensor 194 for generating a proportional pedal position signal PP.

Cylinder (herein also "combustion chamber") 30 of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of the passenger vehicle via a transmission system. Further, a starter motor may be coupled to crankshaft 40 via a flywheel to enable a starting operation of engine 10. Crankshaft 40 is coupled to oil pump 208 to pressurize the engine oil lubrication system 200 (the coupling of crankshaft 40 to oil pump 208 is not shown). Housing 136 is hydraulically coupled to crankshaft 40 via a timing chain or belt (not shown).

Cylinder 30 can receive intake air via intake manifold or air passages 44. Intake air passage 44 can communicate with other cylinders of engine 10 in addition to cylinder 30. In some embodiments, one or more of the intake passages may include a boosting device such as a turbocharger or a supercharger. A throttle system including a throttle plate 62 may be provided along an intake passage of the engine for varying the flow rate and/or pressure of intake air provided to the engine cylinders. In this particular example, throttle plate 62 is coupled to electric motor 94 so that the position of elliptical throttle plate 62 is controlled by controller 12 via electric motor 94. This configuration may be referred to as electronic throttle control (ETC), which can also be utilized during idle speed control.

Combustion chamber 30 is shown communicating with intake manifold 44 and exhaust manifold 48 via respective intake valves 52a and 52b (not shown), and exhaust valves 54a and 54b (not shown). Thus, while four valves per cylinder may be used, in another example, a single intake and single exhaust valve per cylinder may also be used. In still another example, two intake valves and one exhaust valve per cylinder may be used.

Exhaust manifold 48 can receive exhaust gases from other cylinders of engine 10 in addition to cylinder 30. Exhaust gas sensor 76 is shown coupled to exhaust manifold 48 upstream of catalytic converter 70 (where sensor 76 can correspond to various different sensors). For example, sensor 76 may be any of many known sensors for providing an indication of exhaust gas air/fuel ratio such as a linear oxygen sensor, a UEGO, a two-state oxygen sensor, an EGO, a HEGO, or an HC or CO sensor. Emission control device 72 is shown positioned downstream of catalytic converter 70. Emission control device 72 may be a three-way catalyst, a NOx trap, various other emission control devices or combinations thereof.

In some embodiments, each cylinder of engine 10 may include a spark plug 92 for initiating combustion. Ignition system 88 can provide an ignition spark to combustion chamber 30 via spark plug 92 in response to spark advance signal SA from controller 12, under select operating modes. However, in some embodiments, spark plug 92 may be omitted, such as where engine 10 may initiate combustion by auto-ignition or by injection of fuel, as may be the case with some diesel engines.

In some embodiments, each cylinder of engine 10 may be configured with one or more fuel injectors for providing fuel thereto. As a non-limiting example, fuel injector 66A is shown coupled directly to cylinder 30 for injecting fuel directly therein in proportion to the pulse width of signal dfpw received from controller 12 via electronic driver 68. In this manner, fuel injector 66A provides what is known as direct injection (hereafter also referred to as "DI") of fuel into cylinder 30.

Controller 12 is shown as a microcomputer, including microprocessor unit 102, input/output ports 104, an electronic storage medium for executable programs and calibration values shown as read only memory chip 106 in this particular example, random access memory 108, keep alive memory 110, and a conventional data bus. Controller 12 is shown receiving various signals from sensors coupled to engine 10, in addition to those signals previously discussed, including measurement of inducted mass air flow (MAF) from mass air flow sensor 100 coupled to throttle 20; engine coolant temperature (ECT) from temperature sensor 112 coupled to cooling sleeve 114; a profile ignition pickup signal (PIP) from Hall effect sensor 118 coupled to crankshaft 40; and throttle position TP from throttle position sensor 20; absolute Manifold Pressure Signal MAP from sensor 122; an indication of knock from knock sensor 182; and an indication of absolute or relative ambient humidity from sensor 180. Engine speed signal RPM is generated by controller 12 from signal PIP in a conventional manner and manifold pressure signal MAP from a manifold pressure sensor provides an indication of vacuum, or pressure, in the intake manifold. During stoichiometric operation, this sensor can give an indication of engine load. Further, this sensor, along with engine speed, can provide an estimate of charge (including air) inducted into the cylinder. In one example, sensor 118, which is also used as an engine speed sensor, produces a predetermined number of equally spaced pulses every revolution of the crankshaft.

In this particular example, temperature $T_{cat1}$ of catalytic converter 70 is provided by temperature sensor 124 and temperature $T_{cat2}$ of emission control device 72 is provided by temperature sensor 126. In an alternate embodiment, temperature Tcat1 and temperature Tcat2 may be inferred from engine operation.

Continuing with FIG. 1, a variable camshaft timing (VCT) system 19 is shown. In this example, an overhead cam system is illustrated, although other approaches may be used Specifically, camshaft 130 of engine 10 is shown communicating with rocker arms 132 and 134 for actuating intake valves 52a, 52b and exhaust valves 54a, 54b. VCT system 19 may be oil-pressure actuated (OPA), cam-torque actuated (CTA), or a combination thereof. By adjusting a plurality of hydraulic valves to thereby direct a hydraulic fluid, such as engine oil, into the cavity (such as an advance chamber or a retard chamber) of a camshaft phaser, valve timing may be changed, that is advanced or retarded. As further elaborated herein, the operation of the hydraulic control valves may be controlled by respective control solenoids. Specifically, an engine controller may transmit a signal to the solenoids to move a valve spool that regulates the flow of oil through the phaser cavity. As used herein, advance and retard of cam timing refer to relative cam timings, in that a fully advanced position may still provide a retarded intake valve opening with regard to top dead center, as just an example.

Camshaft 130 is hydraulically coupled to housing 136. Housing 136 forms a toothed wheel having a plurality of teeth 138. In the example embodiment, housing 136 is mechanically coupled to crankshaft 40 via a timing chain or belt (not shown). Therefore, housing 136 and camshaft 130 rotate at a speed substantially equivalent to each other and synchronous to the crankshaft. In an alternate embodiment, as in a four stroke engine, for example, housing 136 and crankshaft 40 may be mechanically coupled to camshaft 130 such that housing 136 and crankshaft 40 may synchronously rotate at a speed different than camshaft 130 (e.g. a 2:1 ratio, where the crankshaft rotates at twice the speed of the camshaft). In the alternate embodiment, teeth 138 may be mechanically coupled to camshaft 130. By manipulation of the hydraulic coupling as described herein, the relative position of camshaft 130 to crankshaft 40 can be varied by hydraulic pressures in retard chamber 142 and advance chamber 144 (not shown in FIG. 3, but shown in FIG. 1). By allowing high pressure hydraulic fluid to enter retard chamber 142, the relative relationship between camshaft 130 and crankshaft 40 is retarded. Thus, intake valves 52a, 52b and exhaust valves 54a, 54b open and close at a time earlier than normal relative to crankshaft 40. Similarly, by allowing high pressure hydraulic fluid to enter advance chamber 144, the relative relationship between camshaft 130 and crankshaft 40 is advanced. Thus, intake valves 52a, 52b, and exhaust valves 54a, 54b open and close at a time later than normal relative to crankshaft 40.

While this example shows a system in which the intake and exhaust valve timing are controlled concurrently, variable intake cam timing, variable exhaust cam timing, dual independent variable cam timing, dual equal variable cam timing, or other variable cam timing may be used. Further, variable valve lift may also be used. Further, camshaft profile switching may be used to provide different cam profiles under different operating conditions. Further still, the valvetrain may be roller finger follower, direct acting mechanical bucket, electrohydraulic, or other alternatives to rocker arms.

Continuing with the variable cam timing system, teeth 138, rotating synchronously with camshaft 130, allow for measurement of relative cam position via cam timing sensor 150 providing signal VCT to controller 12. Teeth 1, 2, 3, and 4 may be used for measurement of cam timing and are equally spaced (for example, in a V-8 dual bank engine, spaced 90 degrees apart from one another) while tooth 5 may be used for cylinder identification. In addition, controller 12 sends control signals (LACT, RACT) to conventional solenoid valves (not shown) to control the flow of hydraulic fluid either into retard chamber 142, advance chamber 144, or neither.

Relative cam timing can be measured in a variety of ways. In general terms, the time, or rotation angle, between the rising edge of the PIP signal and receiving a signal from one of the plurality of teeth 138 on housing 136 gives a measure of the relative cam timing. For the particular example of a V-8 engine, with two cylinder banks and a five-toothed wheel, a measure of cam timing for a particular bank is received four times per revolution, with the extra signal used for cylinder identification.

As described above, FIG. 1 merely shows one cylinder of a multi-cylinder engine, and that each cylinder has its own set of intake/exhaust valves, fuel injectors, spark plugs, etc.

Figure 2:
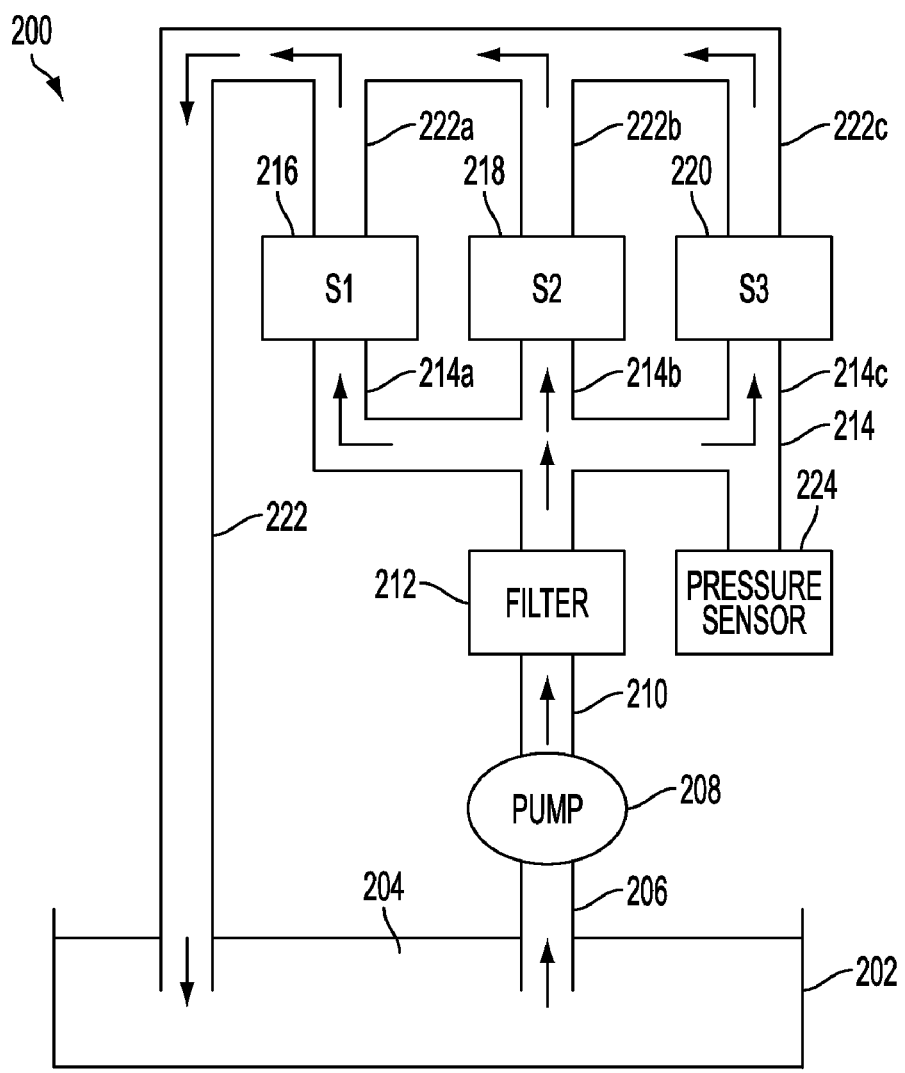
FIG. 2 shows a block diagram of an engine oil lubrication system.

FIG. 2 shows an example embodiment of an engine oil lubrication system 200 with an oil pump 208 coupled to crankshaft 40 (not shown), and including various oil subsystems 216, 218, 220. The oil subsystem may utilize oil flow to perform some function, such as lubrication, actuation of an actuator, etc. For example, one or more of the oil subsystems 216, 218, 220 may be hydraulic systems with hydraulic actuators and hydraulic control valves. Further, the oil subsystems 216, 218, 220 may be lubrication systems, such as passageways for delivering oil to moving components, such as the camshafts, cylinder valves, etc. Still further non-limiting examples of oil subsystems are camshaft phasers, cylinder walls, miscellaneous bearings, etc.

Oil is supplied to the oil subsystem through a supply channel and oil is returned through a return channel. In some embodiments, there may be fewer or more oil subsystems.

Continuing with FIG. 2, the oil pump 208, in association with the rotation of crankshaft 40 (not shown), sucks oil from oil reservoir 204, stored in oil pan 202, through supply channel 206. Oil is delivered from oil pump 208 with pressure through supply channel 210 and oil filter 212 to main galley 214. The pressure within the main galley 214 is a function of the force produced by oil pump 208 and the flow of oil entering each oil subsystem 216, 218, 220 through supply channels 214a, 214b, 214c, respectively. Oil returns to oil reservoir 204 at atmospheric pressure through return channel 222. Oil pressure sensor 224 measures main galley oil pressure and sends the pressure data to controller 12 (not shown).

The level of the main galley oil pressure can affect the performance of one or more of the oil subsystems 216, 218, 220, for example the force generated by a hydraulic actuator is directly proportional to the oil pressure in the main galley. When oil pressure is high, the actuator may be more responsive; when oil pressure is low, the actuator may be less responsive. Low oil pressure may also limit the effectiveness of engine oil to lubricate moving components. For example, if the main galley oil pressure is below a threshold pressure, a reduced flow of lubricating oil may be delivered, and component degradation may occur.

Additionally, the main galley oil pressure is highest when there is no or reduced flow of oil out of the main galley. Thus, leakage of hydraulic actuators in the oil subsystems can reduce main galley oil pressure. Further, one particular source of oil leakage can occur in the variable cam timing phaser, as described in further detail with regard to FIGS. 3A-3B.

FIGS. 3A and 3B show an oil subsystem 220 in two different states. Oil subsystem 220 (herein also "phaser") is comprised of variable cam timing actuator (herein also "actuator") 360, variable force solenoid (herein also "solenoid") 310, oil control spool valve (herein also "spool valve") 300, cam journal 370, and hydraulic channels (herein also "channels") 316, 317, 318, 320, 322. Channel 316 connects main galley 214 to spool valve 300; channels 317, 318 connect spool valve 300 to return channel 222; channel 320 connects spool valve 300 to retard chamber 142 in actuator 360 via cam journal passage 342; channel 322 connects spool valve 300 to advance chamber 144 in actuator 360 via cam journal passage 344. Cam journal 370 includes cam shaft 130, cam journal passages 342 and 344, cam journal cap 380, and cylinder head cam bore 381. Cam journal cap 380, mechanically coupled to the cylinder head (not shown), forms a cylindrical bearing within which cam shaft 130 may rotate. In FIG. 3A, a cut-away view of cam journal cap 380 is shown with cap top 380a, cylinder head cam bore 381, and cap seal landing 380c. Oil passages may be integrated into cam journal cap 380 as shown on either side of cap seal landing 380c. Cam journal passage 342 provides a hydraulic channel for oil between channel 320 and retard chamber 142. Cam journal passage 344 provides a hydraulic channel for oil between channel 322 and advance chamber 144. Cap seal landing 380c provides separation between cam journal passages 342 and 344. Thus, in one particular example, a cam-fed oil pressure actuated system may be used.

Actuator 360 is comprised of rotor 330, housing 136, retard chamber 142, advance chamber 144 (not shown), locking pin 332, and optional return spring 334. Rotor 330 is attached to camshaft 130 so it rotates at the same speed as camshaft 130. Rotor 330 is hydraulically coupled to housing 136. Phaser vanes 330a, 330b, 330c, 330d move within the recesses formed by retard chamber 142 and advance chamber 144. Spool valve 300 allows rotor 330 to move, by permitting oil flow into retard chamber 142 and out of advance chamber 144 or vice versa, depending on the desired direction of movement (that is, depending on whether a cam advance or a cam retard is desired). During a cam retard, oil from supply channel 316 flows through spool valve 300 and channel 320 and cam journal passage 342 into retard chamber 142 while oil is pushed from advance chamber 144 into cam journal passage 344 and channel 322 through spool valve 300 and out channel 318. During a cam advance, oil from supply channel 316 flows through spool valve 300 and channel 322 and cam journal passage 344 into advance chamber 144 while oil is pushed from retard chamber 142 into cam journal passage 342 and channel 320 through spool valve 300 and out channel 317. Housing 136 forms a mechanical stop for rotor 330. When retard chamber 142 is maximally open and rotor 330 is resting against housing 136, actuator 360 is at the retard end position (herein also "base position") and cam timing is maximally retarded. When advance chamber 144 is maximally open and rotor 330 is resting against housing 136, actuator 360 is at the advance end position and cam timing is maximally advanced. Optional return spring 334 and locking pin 332 may hold rotor 330 in the base position when oil pressure is low, such as during cold start. As oil pressure increases, locking pin 332 can be retracted so rotor 330 is free to move as described previously. When return spring 334 is present, return spring 334 generates a force that biases rotor 330 toward the base position regardless of oil pressure.

Spool valve 300 is comprised of a sleeve 308 for receiving a spool 314 with spool lands 314a, 314b, 314c and a biasing spring 312. Solenoid 310, controlled by electronic control unit (ECU) 302 (which may be controller 12), moves spool 314 within sleeve 308. The position of spool 314 is determined by balancing the force of biasing spring 312 against the force generated by solenoid 310. Spool landings 314a, 314b, 314c are used to restrict or block the flow of oil through the hydraulic channels. Spool 314 can be adjustable such that spool valve 300 operates among a plurality of ranges including a first range generating a hydraulic force in a first direction on the actuator toward a first end position, a second range generating a hydraulic force in a second, opposite direction on the actuator toward a second, opposite end, position, and a neutral range between the first and second ranges. In one example, the first range is a retard range, and the second range is an advancing range.

In the retarding range, oil flows from spool valve 300 into retard chamber 142 forcing actuator 360 to retard cam timing, up to the maximally retarded cam timing. Spool landing 314a blocks channel 317, a channel is open from channel 316 to channel 320 between spool landings 314a, 314b, and a channel is open from channel 322 to channel 318 between spool landings 314b, 314c. One case of the retarding range is when solenoid 310 is not energized (e.g. has no current applied to it) and actuator 360 is at the base position. In the advancing range, oil flows from spool valve 300 into advance chamber 144 forcing actuator 360 to overcome return spring 334 and advance cam timing, up to the maximally advanced cam timing. Spool landing 314c blocks channel 318, a channel is open from channel 316 to channel 322 between spool landings 314b, 314c, and a channel is open from channel 320 to channel 317 between spool landings 314a, 314b in the advancing range. In the neutral range, hydraulic forces on the actuator are substantially balanced so actuator 360 will neither advance nor retard cam timing. Torque from return spring 334 is countered by a positive pressure differential from advance chamber 144 to retard chamber 142. In the neutral range, spool landing 314c blocks channel 318, a weak channel is open from channel 316 to channel 322 between spool landings 314b, 314c, and a weak channel is open from channel 320 to channel 317 between spool landings 314a, 314b.

As noted above, FIGS. 3A-3B show spool valve 300 in two different positions, one generating more leakage through cam journal 370, the other generating less leakage through cam journal 370. FIG. 3A shows a substantially de-energized setting for solenoid 310 when actuator 360 is to be held in the base position, and timing is to be held at base timing. Solenoid 310 is de-energized so high pressure oil from main galley 214 can flow through hydraulic channels 316, 320, and 342 into retard chamber 142 and atmospheric pressure oil can flow from advance chamber 144 to oil reservoir 204 through hydraulic channels 344, 322, and 318. The pressure difference creates torque 336 that pushes against the vanes of rotor 330 to hold actuator 360 in the base position. Return spring 334 also creates torque holding actuator 360 in the base position. Pressure in hydraulic channels 316, 322, and 342 leading to retard chamber 142 is near the main galley pressure and pressure in hydraulic channels 318, 322, and 344 leading from advance chamber 144 is near atmospheric pressure. The high pressure difference may create high leakage through cam journal 370 as high pressure oil leaks through the small radial clearance between cam shaft 130 and cap seal landing 380c from cam journal passage 342 to cam journal passage 344. From cam journal passage 344, the oil flows through channels 322 and 318 to oil reservoir 204. Cam journal leakage can reduce the main galley pressure which can affect the performance of other oil subsystems, as noted in FIG. 2. The pressure difference also increases the delay when first advancing from base timing. Oil subsystem 220 flows enough oil to reverse the pressure differential in the phaser and to generate pressure in the advance direction to overcome return spring 334 before the cam timing can begin to advance.

During selected conditions, such as during engine idle when the engine oil exceeds a threshold temperature and when the engine oil pressure exceeds a threshold pressure, it is possible to maintain base timing while also reducing cam journal oil leakage. FIG. 3B shows phaser 220 under such conditions such that actuator 360 is in the base position and spool valve 300 is in the retarding range, but at an end of the retarding range near the neutral range. ECU 302 applies current to solenoid 310 such that spool 314 is moved until the hydraulic path from channel 316 to channel 320 is slightly open and the hydraulic path from advance chamber 144 through channels 344, 322, 318 is slightly open. Pressure in retard chamber 142 is sufficient to maintain actuator 360 in the base position, but the pressure in retard chamber 142 and hydraulic channels 342 and 320 is considerably lower than the high pressure from main galley 214. Pressure in advance chamber 144 and hydraulic channels 344 and 322 is near the atmospheric pressure of oil reservoir 204. Oil leakage across cap seal landing 380c from cam journal passage 342 to cam journal passage 344 is reduced because the pressure difference across cam journal passage 342 and cam journal passage 344 is much less than when solenoid 310 is de-energized. Rotor 330 is held in place by forces from return spring 334 and the pressure in retard chamber 142 so that base timing can be maintained. The reduced oil pressure will result in faster response time, as compared to the oil subsystem in FIG. 3A, when cam timing begins to advance. The smaller initial pressure in retard chamber 142 requires less oil to flow to generate enough pressure in the advance direction to overcome return spring 334. As such, in the particular example of a cam-fed oil pressure actuated system, it is possible to address oil leakage that may occur between the advance and retard oil passages in the cam journal bearing due to the pressure differential between the two passages.

As further elaborated with reference to FIG. 4, a routine 400 may be executed by an engine controller, such as 12, to carry out a control method for a hydraulically actuated variable cylinder valve actuator coupled to a cylinder valve of the engine, such as the variable cam timing actuator 360, controlled by a hydraulic valve, such as spool valve 300. In one example, the method includes, during selected conditions and when the actuator is held at a first end position by the biasing spring, adjusting the hydraulic valve to within a first range and closer to the neutral range than to a full actuation boundary of the first range. For example, the actuator may be held in the retard range near the neutral range, thus reducing oil pressure across the actuator thereby reducing oil leakage and enabling a faster response when moving the actuator away from the first end position. Further, different operating modes may be carried out depending on operating conditions. For example, in a first mode during selected conditions and when the variable cam timing actuator is held at the fully retarded timing position by the biasing spring, the routine may include adjusting the valve to within a first retarded range and closer to the neutral range. In a second mode, the routine may include advancing the cam timing from the fully retarded timing position by adjusting the spool valve from within the first retarded range and closer to the neutral range to the second advance range.

Therefore, returning to routine 400, at 402, the method includes measuring and/or estimating the engine operating conditions. The conditions assessed may include measured VCT timing, commanded VCT timing, engine oil temperature, engine speed, idle speed, barometric pressure, a driver-demanded torque (for example, from a pedal-position sensor), manifold pressure (MAP), manifold air flow (MAF), air temperature, vehicle speed, etc. An idle flag can be set when the engine speed is equal to or below the idle speed for the current engine operating conditions. The idle flag will be clear if the engine speed exceeds the idle speed.

A determination is made at 404 whether the idle flag has been set. If the idle flag is not set then the routine is ended. If the idle flag is set, at 406, it is determined whether conditions for a potential oil leak are present. As non-limiting examples, oil leaks are more likely when the engine oil exceeds some threshold temperature, when the engine oil pressure exceeds some threshold pressure, when vehicle speed is zero and when a driver pedal depression is less than a threshold amount and when wheel brakes are actuated, and when engine speed is controlled to a desired idle speed, etc. If conditions for oil leakage are not present, the routine ends. In general, routine 400 may be used at a high temperature (e.g., above a threshold temperature) and/or below a low speed threshold so as not to degrade fuel economy across the entire oil temperature range.

If conditions for oil leakage exist, a determination is made at 408 whether active VCT control in enabled or disabled. Active VCT control uses feedback to calibrate solenoid current as engine operating conditions change over time. Active VCT control may be disabled when it is prudent to minimize the potential for introducing disturbances to engine combustion, such as during idle, during cold start and warm up from ambient conditions. Active VCT control may also be disabled when the cam timing is fully advanced or fully retarded. Active VCT control may transition from disabled to enabled when cam timing is neither fully advanced nor fully retarded and the spool valve is in the null position. Routine 400 proceeds from 408 to 418 when active VCT control is enabled. Routine 400 proceeds from 408 to 410 when active VCT control is disabled.

At 418, active feedback control of cam timing can be performed. During active feedback control, the measured relative cam timing is used in a feedback control loop to adjust advance or retard pressure (e.g., via spool valve 300). Next, at 420, the holding current for maintaining spool valve 300 in the null position can be observed and stored in a table indexed by various parameters such as engine oil temperature, engine speed, etc. The null position can be determined when actuator 360 is not fully advanced or fully retarded and the measured cam timing is not currently changing. From the null position, increasing solenoid current to the point where actuator 360 starts to advance will give the rightmost null position. From the null position, decreasing solenoid current to the point where actuator 360 starts to retard will give the leftmost null position. As one example, the observing may include determining limits (leftmost and rightmost null positions) of the neutral range while performing feedback control when the actuator is away from and between the first end position and the second end position. The storing may include adjusting the leftmost and rightmost null positions in a table indexed by the current engine operating conditions. Further, once the neutral range is learned, the first (retard) range limits and the second (advance) range limits can be determined and table entries corresponding to current engine operating conditions can be adjusted in response to the determined neutral range.

A determination is made at 410 whether the measured cam timing is at base timing. If the measured cam timing is not at base timing, at 416, timing degradation may be indicated and the routine can end. If the measured cam timing is at base timing, at 412, the learned null position for the current operating conditions can be retrieved. At 414, solenoid current can be driven with the value below null but still in the retarding direction so actuator 360 is held in the base position, leakage is reduced between cam journal passages 342 and 344, and main galley pressure is increased.

In one particular example, at 414, solenoid current adjusts the spool valve to within the first range and closer to the neutral range than to a full actuation boundary of the first range, where the first range may be the retarding range and the second range may be the advancing range. One example of near the neutral range could be adjusting the spool valve to be within 20% of the neutral range. Another example of near the neutral range could be adjusting the spool valve so that oil flow in the retard direction is less than 40% of maximum retard flow. 414 may include adjusting spool valve 300 to at least partially block communication to an actuator chamber (e.g., the retard chamber 142), that generates a torque toward the spring-generated base position.

In addition to reduced leakage, energizing solenoid 310 has the added advantage of improving the response time of the phaser when it moves from the base position to a more advanced position. Since the pressure differential is reduced between retard passage 342 and advance passage 344 the system may respond faster in the advance direction as less oil flow may be needed to generate the pressure differential to begin moving rotor 330.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be encoded as microprocessor instructions and stored into the computer readable storage medium in the engine control system.

FIG. 5 shows a prophetic example of two characterizations of solenoid current versus oil flow through the oil control valve spool. One curve shows oil flow as current is swept from 0 amps to 1 amp and the other curve shows oil flow as current is swept from 1 amp to 0 amps. The different curves show hysteresis in the oil flow versus current. Retarding range 510, neutral range 520, and advancing range 530 are illustrated. The leftmost end 560 (full retarding actuation boundary) of the retarding range is where the solenoid is de-energized and where the actuator will be forced to the first end position. The leftmost null position 570 is also the rightmost end of the retarding range. The leftmost null position 570 is where forces in the advance and retard directions are balanced such that cam timing will be neither advancing nor retarding, but slight additional retard pressure will cause cam timing to retard. The rightmost null position 580 is also the leftmost end of the advancing range. The rightmost null position 580 is where forces in the advance and retard directions are balanced such that cam timing will be neither advancing nor retarding, but slight additional retard pressure will cause cam timing to retard. The null position may be the average of the leftmost null position and rightmost null position. The rightmost end 590 (full advancing actuation boundary) of the advancing range is where the solenoid is fully energized and where the actuator will be forced to the second end position. Operating condition 540 shows leakage through cam journal 370 when actuator 360 is at the base position and solenoid 310 is de-energized, as in FIG. 3A, for example. Operating condition 550 shows leakage through cam journal 370 when solenoid current is in the first range, but near neutral range 520, as in FIG. 3A, for example. In one example, the routine of FIG. 4 may select range 550 as a desired set-point for the spool valve in 412 and 414.

Figure 6:
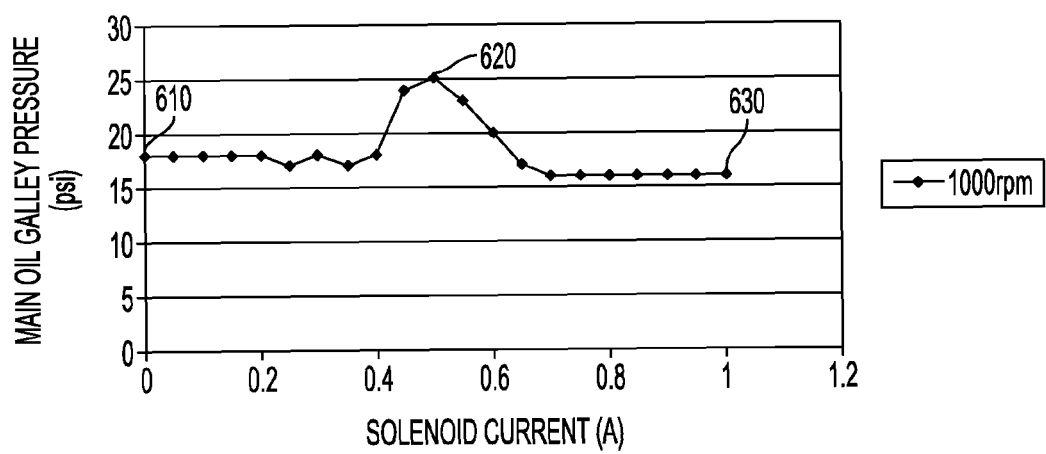

FIG. 6 shows a prophetic example of the characterization of solenoid current versus main galley oil pressure. Main galley pressure 610 occurs when solenoid 310 is de-energized. Main galley pressure 620 peaks when solenoid 310 is operating in or near the neutral range 520. Main galley pressure 630 occurs when solenoid 310 is fully energized.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, gasoline, diesel and other engine types and fuel types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application.

Such claims, whether broader, narrower, equal, or different in scope to the original claims, also are regarded as included within the subject matter of the present disclosure.

The invention claimed is:

1. A method of controlling an engine including a hydraulically actuated cylinder valve actuator controlled by a hydraulic valve adjustable among a plurality of ranges including a first range generating hydraulic force in a first direction on the actuator toward a first end position, a second range generating hydraulic force in a second, opposite direction on the actuator toward a second, opposite end, position, and a neutral range between the first and second ranges, comprising:

when the actuator is at the first end position, adjusting the hydraulic valve to within the first range and closer to the neutral range than to a full actuation boundary of the first range.

2. The method of claim 1 wherein the adjusting the hydraulic valve includes adjusting the hydraulic valve to near the neutral range, and where hydraulic forces on the actuator are substantially balanced in the neutral range.

3. The method of claim 1 wherein the hydraulic valve is a spool valve, and wherein the adjusting includes adjusting the spool valve to at least partially block communication to a drain in the spool valve and an actuator chamber.

4. The method of claim 1 further comprising determining limits of the neutral range while performing feedback control when the actuator is away from and between the first end position and the second end position.

5. The method of claim 4 further comprising adjusting determinations of limits of the first and/or second ranges in response to the determined neutral range, where when the actuator is held at the first end position, adjusting the hydraulic valve to within the first, adjusted, range.

6. The method of claim 1 wherein the adjusting is performed during selected conditions including during idle.

7. The method of claim 6 wherein the selected conditions include when vehicle speed is zero and when a driver pedal depression is less than a threshold amount and when wheel brakes are actuated, and when engine speed is controlled to a desired idle speed.

8. The method of claim 1 wherein the adjusting is performed during selected conditions including when not performing feedback control of cam timing, the feedback control including the actuator being between the first and second end positions.

9. The method of claim 8 wherein the selected conditions include when engine oil temperature is above a threshold value.

10. The method of claim 1 wherein the actuator is a variable cam timing actuator, the method further comprising adjusting the hydraulic valve to advance cam timing from the first end position by adjusting the hydraulic valve from within the first range and closer to the neutral range than to a full actuation boundary of the first range to within the second range.

11. A method of hydraulically controlling a variable cam timing actuator of an engine through an electromechanically actuated solenoid spool valve, the spool valve adjustable among a plurality of ranges including a first range generating a hydraulic force in a retard direction on the variable cam timing actuator toward a first retarded end position, a second range generating a hydraulic force in a second advance direction on the variable cam timing actuator toward a second, advanced end, position, and a neutral range between the first and second ranges, the method comprising:

during engine operation and when the variable cam timing actuator is maintained in a fully retarded position, adjusting the spool valve to be within the first range closer to the neutral range than to a full retard end of the first range; and during engine operation and when the variable cam timing actuator is away from the fully retarded position, adjusting the spool valve based on feedback cam timing to maintain a desired cam timing position.

12. The method of claim 11 wherein the adjusting the spool valve to be within the first range closer to the neutral range than to a full retard end of the first range includes adjusting the spool valve to be within 20% of the neutral range.

13. The method of claim 11 wherein the adjusting the spool valve to be within the first range closer to the neutral range than to a full retard end of the first range includes adjusting the spool valve so that oil flow in the retard direction is less than 40% of maximum retard flow.

14. The method of claim 11 further comprising, during feedback adjustment, learning limits of the neutral range.

15. The method of claim 14 wherein the engine operation when the variable cam timing actuator is maintained in the fully retarded position includes during engine idling condition and when the engine is warming up from ambient temperature.

16. A system for an engine, comprising:
a hydraulically actuated variable cam timing actuator;
a cam with oil passages used to deliver oil from oil passages in a cam cap to the variable cam timing actuator coupled to the cam;
a cylinder having at least a cylinder valve actuated by the cam;
a hydraulic spool valve coupled to the variable cam timing actuator, the spool valve adjustable among a plurality of ranges including a first retard range generating a hydraulic force in a first direction on the variable cam timing actuator toward a fully retarded timing position, a second advance range generating a hydraulic force in a second, opposite direction on the variable cam timing actuator toward a fully advanced timing position, and a neutral range between the first and second ranges; and
computer readable storage medium having instructions encoded therein, including:
instructions for operating in a first mode during selected conditions and when the variable cam timing actuator is held at the fully retarded timing position, adjusting the spool valve to within the first retard range and closer to the neutral range; and
instructions for operating in a second mode that includes advancing the cam timing from the fully retarded timing position by adjusting the spool valve from within the first retard range and closer to the neutral range, to the second advance range.

17. The system of claim 16 wherein the selected conditions during the first mode include during engine idling, when vehicle speed is zero and when a driver pedal depression is less than a threshold amount, and when wheel brakes are actuated, and wherein oil is supplied through the oil passages in the cam to the hydraulically actuated variable cam timing actuator.

18. The system of claim 17 wherein the selected conditions during the first mode include when not performing feedback control of cam timing, the feedback control including the variable cam timing actuator being between the fully retarded and fully advanced timing positions.

19. The system of claim 16 wherein the selected conditions during the first mode include when engine oil temperature is above a threshold value.

20. A method of hydraulically controlling a VCT-actuator through a spool valve comprising:
during engine operation and when the VCT-actuator is maintained in a fully retarded position, adjusting the spool valve to be closer to a neutral range than to the fully retarded position; and
during engine operation and when the VCT-actuator is away from the fully retarded position, adjusting the spool valve based on feedback of cam timing to maintain a desired cam timing.

* * * * *